United States Patent [19]
Thompson

[11] Patent Number: 6,065,880
[45] Date of Patent: May 23, 2000

[54] LASER ENHANCED PERSONAL DATA ASSISTANT

[75] Inventor: Curtis Thompson, Salt Lake City, Utah

[73] Assignee: 3Com Corporation, Santa Clara, Calif.

[21] Appl. No.: 09/036,851

[22] Filed: Mar. 9, 1998

[51] Int. Cl.⁷ .................................................. G06F 13/00
[52] U.S. Cl. ................................ 385/88; 235/454; 710/72
[58] Field of Search ........................ 385/88, 89, 92–94; 372/109; 235/462, 472, 454; 710/62, 63, 72–74

[56] References Cited

U.S. PATENT DOCUMENTS

| | | | |
|---|---|---|---|
| 5,664,231 | 9/1997 | Postman et al. | 710/73 |
| 5,671,374 | 9/1997 | Postman et al. | 710/129 |
| 5,675,524 | 10/1997 | Bernard | 708/109 |
| 5,778,256 | 7/1998 | Darbee | 710/72 |

*Primary Examiner*—John D. Lee
*Attorney, Agent, or Firm*—Workman, Nydegger & Seeley

[57] ABSTRACT

An adapter having an L-shaped housing is configured for removable attachment to a conventional PDA. The adapter is electrically coupled with the PDA and includes a laser or other light source configured to selectively emanate a light beam that can be modified into a digital signal. The digital signal can be received by a photo detector on a computer for facilitating a download of data from the PDA to the computer. The light beam from the laser can also be used as a presentation pointer. The adapter further includes a photo detector which is selectively positioned relative to the laser so that the light beam from the laser can be reflected off a bar code and received by the photo detector. The reflected signal is then converted to a digital signal which is then forwarded to the PDA for storage or access of other corresponding information.

20 Claims, 5 Drawing Sheets

LASER ENHANCED PERSONAL DATA ASSISTANT

BACKGROUND OF THE INVENTION

1. The Field of the Invention

The present invention relates to personal data assistants (PDAs) and, more specifically, PDAs or adapters therefor with enhanced data transmission and receiving capabilities.

2. Present State of the Art

Personal data assistants (hereinafter "PDAs") are small, substantially hand-sized computers that are used for storing, manipulating, and retrieving a defined amount of data. One example of a PDA is the PalmPilot® manufactured by 3Com. The PalmPilot® functions primarily as an electronic day planner and address recorder.

Although PDAs are increasing in popularity, they still have several shortcomings which limit their use. For example, transferring data between a PDA and a personal or network computer is accomplished by physically electrically coupling a cradle to the host computer. The PDA is then physically electrically coupled to the cradle. Software loaded in the host computer is then used to access the PDA and download or upload information therebetween. This process is somewhat time consuming and annoying when all that is wanted is to quickly download or dump information from the PDA into the computer. The problem is exacerbated when it is needed to frequently download information.

Another shortcoming of conventional PDAs is that it is difficult and time consuming to manually input data into the PDA. PDAs typically do not have a keyboard. Information is thus manually input by either using a special pen to scribe letters onto a screen or by selecting letters or numbers displayed on the screen. Such inputing of data can be extremely laborious and time consuming.

OBJECTS AND BRIEF SUMMARY OF THE INVENTION

Accordingly, it is an object of the present invention to provide PDAs and/or adapters for PDAs that can quickly and easily download information into a host computer without having to physically electrically couple the PDA to the host computer.

Yet another object of the present invention is to provide PDAs and/or adapters for PDAs that can be used to quickly input data into the PDA.

To achieve the foregoing objectives, and in accordance with the invention as embodied and broadly described herein, an adapter for a PDA is provided. The adapter has a substantially L-shaped housing that can be physically and electrically coupled with a conventional PDA. Disposed within the housing of the adapter is a micro processor and a light source which are energized by enclosed batteries. In one embodiment, the light source is a laser. In another embodiment, the light source is a light emitting diode.

The light source emits a light beam which can be converted into a digital signal. This can be accomplished by using a switch which turns the light source on and off. Alternatively, a liquid crystal display (LCD) can be positioned in front of the light source which can then be selectively turned on and off to block the light beam.

When it is desired to download the data stored on the PDA, the micro processor in the adapter transmits a corresponding series of digital pulses using the light source. These pulses are received by a photo detector of a host computer. The photo detector is coupled with a processor which receives, processes, and stores the data stream. The adapter can thus be used to download information from the PDA to a host computer without effecting a physical electrical connection therebetween.

The adapter can also be used to automatically input bar code readings into the PDA. In this embodiment, the light source emits a thin highly culminated light beam such as that used in conventional scanners. By manually moving the combined PDA and adapter, the light beam is scanned across the bar code. A photo detector is mounted on the adapter and is positioned such that the portion of the light beam reflecting off the bar code is received by the photo detector as an analog signal. The analog signal is then converted into a digital signal which is subsequently forwarded to the microprocessor and subsequently to the PDA.

As a result of being able to scan bar code readings into the PDA, the functionality of the PDA is substantially increased. For example, the PDA can now effectively be used for monitoring and controlling inventory or other products on which bar codes can be positioned.

In yet another embodiment, it is envisioned that the electronics of the adapter can be integrally incorporated into a PDA so as to eliminate the need for the adapter. However, the adapter is advantageous in retrofitting to existing PDAs. Furthermore, by using the removable adapter, the size of the PDA can be kept to a minimum.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
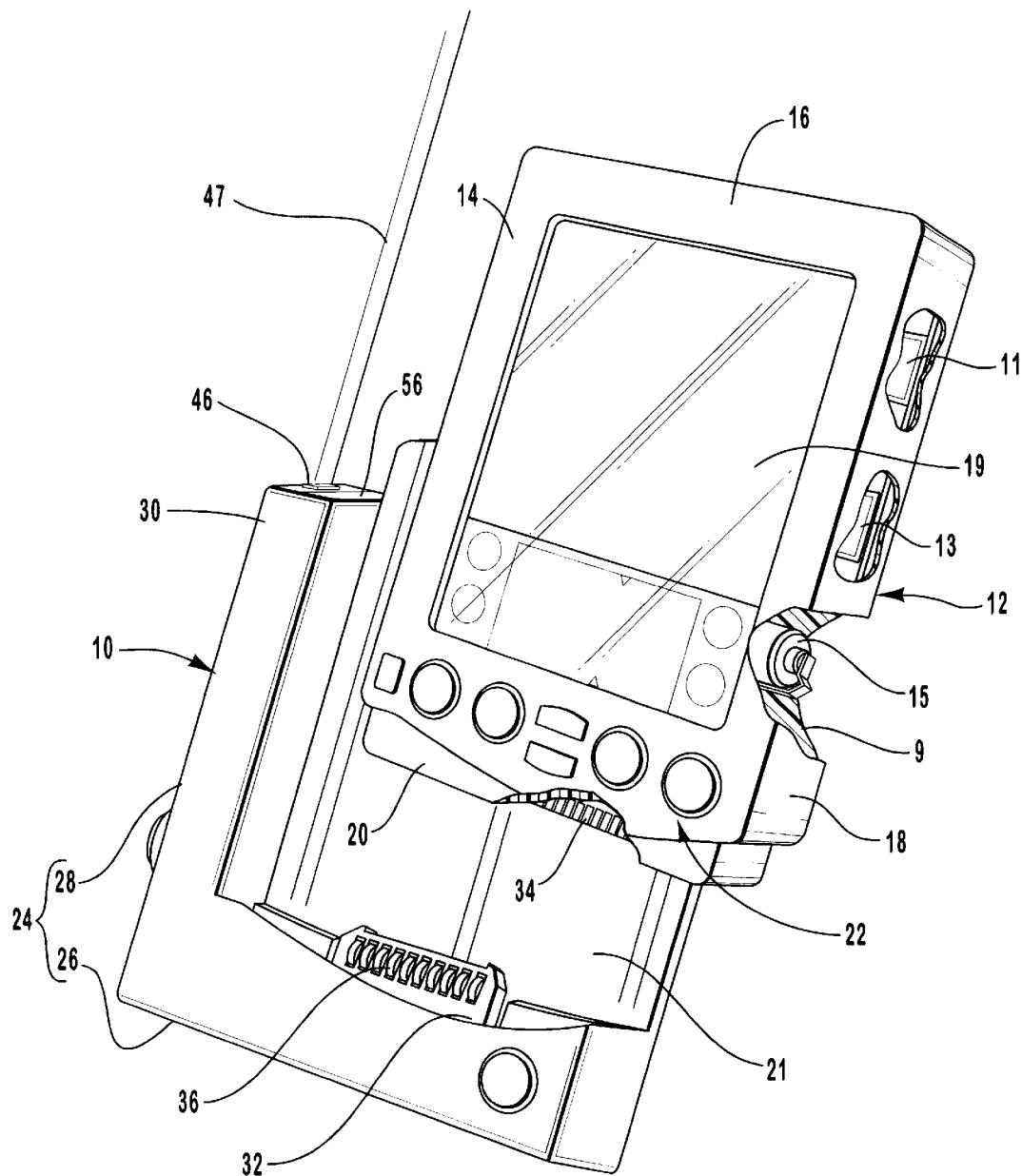
FIG. 1 is a front perspective view of a PDA separated from an adapter.

Depicted in FIG. 1 is one embodiment of an inventive adapter 10 for use with a conventional PDA 12. PDAs come in a variety of makes, styles, and configurations. In one embodiment of the present invention, PDA 12 includes a PalmPilot® made by 3Com. PDA 12 includes a low profile box shaped case or housing 9 having a front face 14 extending from a top end 16 to a bottom end 18. Mounted on front face 14 is a display screen 19. Positioned at bottom end 18 are control buttons 22. Disposed within housing 9 is a micro processor 11 coupled with memory 13 such as RAM, and batteries 15 for powering the system. The microprocessor interacts with an operating system that runs selective software depending on the intended use of PDA 12. In one conventional use, memory 13 is loaded with software code for operating an electronic day planner and address notebook.

Adapter 10 has a substantially L-shaped housing 24 which comprises a base 26 and an arm 28. Arm 28 extends to a free end 30. In one embodiment, a support back 21 extends between base 26 and arm 28. The present invention also includes means for removably coupling adapter 10 to PDA 12. By way of example and not limitation, bottom end 18 of PDA 12 includes a tapered section 20. Recessed within base 26 is a complimentary socket 32. Socket 32 is configured to receive tapered section 20 so as to removably secure PDA 12 is to adapter 10. Of course, there are a variety of alternative configurations which can be used for helping to secure PDA 12 within socket 32. For example, spring biased members or interlocking ridges can be used for further facilitating the connection. In yet other alternative embodiments, there are a variety of different latches, straps, and connectors that can be used for securely holding PDA 12 to adapter 10.

Means are also provided for effecting electrical communication between PDA 12 and adapter 10. By way of example and not limitation, a first interface connector 34 is mounted to bottom 18 of PDA 12. First interface connector 34 is electrically coupled with the circuitry within PDA 12. Disposed within socket 32 of adapter 10 is a second interface connector 36. Interface connectors 34 and 36 are configured to electrically couple together when PDA 12 is coupled to adapter 10. Interface connectors 34 and 36 permit the transfer of electronic data between PDA 12 and housing 10. In one embodiment, interface connectors 34 and 36 comprise an RS232 connection.

Figure 2:
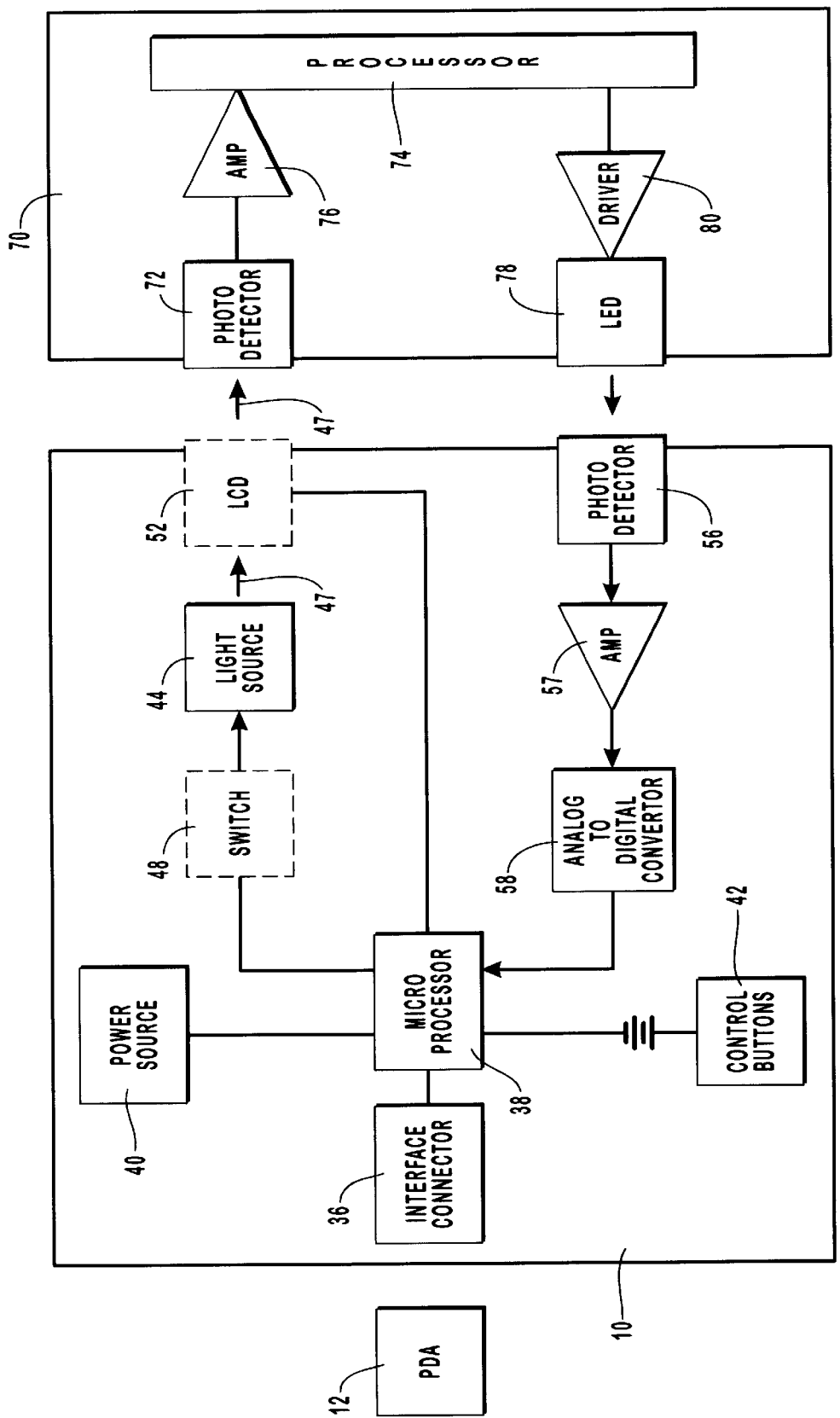
FIG. 2 is a block diagram of the components of the adapter shown in FIG. 1 and components of a computer.

FIG. 2 in part depicts a functional block diagram of the electrical system of adapter 10. As depicted therein, interface connector 36 is electrically coupled with a micro processor 38. Micro processor 38 and the other electrical components are driven by a power source 40. In one embodiment, power source 40 can comprise the same type of battery system as used in a conventional PDA. Micro processor 38 is selectively operated by a series of control buttons 42. Control buttons 42 can be positioned on adapter 10 and/or on PDA 12. In an alternative embodiment, micro processor 38 can be eliminated. In this embodiment, the processing functions would be handled by micro processor 11 within PDA 12.

In one embodiment, a light source 44 is electrically coupled with micro processor 38. In other embodiments, light source 44 can be directly coupled with power source 40. As depicted in FIG. 1, light source 44 is preferably positioned within arm 28 so as to emit a light beam 47 out through a window 46 at free end 30.

Light source 44 can have a variety of configurations. For example, in one embodiment light source 44 can be a simple light emitting diode such as an infrared emitter. In another embodiment, light source 44 can comprise a laser. In one embodiment, the laser can comprise a red light emitting laser wherein the light is sufficiently collimated that the laser can be used as a conventional laser display pointer for use in lectures or presentations.

Also depicted in FIG. 2 is a simple block diagram of a host computer 70 such as a personal computer or a network computer. Computer 70 includes a photo detector 72 coupled to a processor 74 through an amplifier 76. A light emitting diode 78 is also electrically coupled to processor 74 and is operated by a driver 80.

Where light source 44 is used for downloading information from PDA 12 to host computer 70, means are also provided for converting light beam 47 into a digital signal. This can be accomplished in a variety of different ways. As depicted in FIG. 2, by way of example and not limitation, a switch 48 can be positioned between micro processor 38 and light source 44. Micro processor 38 operates switch 48 to turn light source 44 off and on at select high frequency intervals such that light beam 47 emitted from light source 44 is converted into a digital signal. The digital signal is transmitted to photo detector 72 of computer 70 and subsequently decoded by processor 74. Where light source 44 is a laser, the above configuration can be used to download data from PDA 12 to host computer 70 over an extended distance. In one embodiment, light source can be used to download data to host computer 70 over a distance greater than about two feet, preferably greater than about five feet, and more preferably greater than about ten feet.

The transfer is accomplished by aiming light beam 47 at photo detector 72 and then pressing a select control button 42 that instructs micro processor 38 to transfer the stored data in PDA 12 in digital format using light beam 47. Where light source 44 is simply a light emitting diode, or other non-collimated light source, adapter 10 and PDA 12 may have to be set down close to photo detector 72 and aligned therewith before attempting to transfer the data. In either event, data is quickly and effectively downloaded from PDA 12 to computer 70 without the required use of a cradle or other physical electrical connection.

In yet another alternative embodiment for converting light beam 47 from light source 44 into a digital signal, rather than using switch 48, a liquid crystal display (LCD) 52 is positioned within adapter 10 in the path of light beam 47. LCD 52 is controlled to turn on and off by micro processor 38. When LCD 52 is on, LCD 52 blocks light beam 47 from emanating from adapter 10. Conversely, when LCD 52 is off, light beam 47 freely emanates from adapter 10. Accordingly, by micro processor 38 turning LCD 52 on and off at select high frequencies, light beam 47 is converted into digital signals for being received by photo detector 72.

If desired, comparable technology can also be used to upload data from computer 70 to PDA 12. By way of example, adapter 10 can include a photo detector 56 that is coupled with micro processor 38 through an amplifier 57. Digital signals transmitted by LED 78 are received by photo detector 56 and subsequently decoded by micro processor 38 or are transferred to PDA 12 for decoding.

Figure 3:
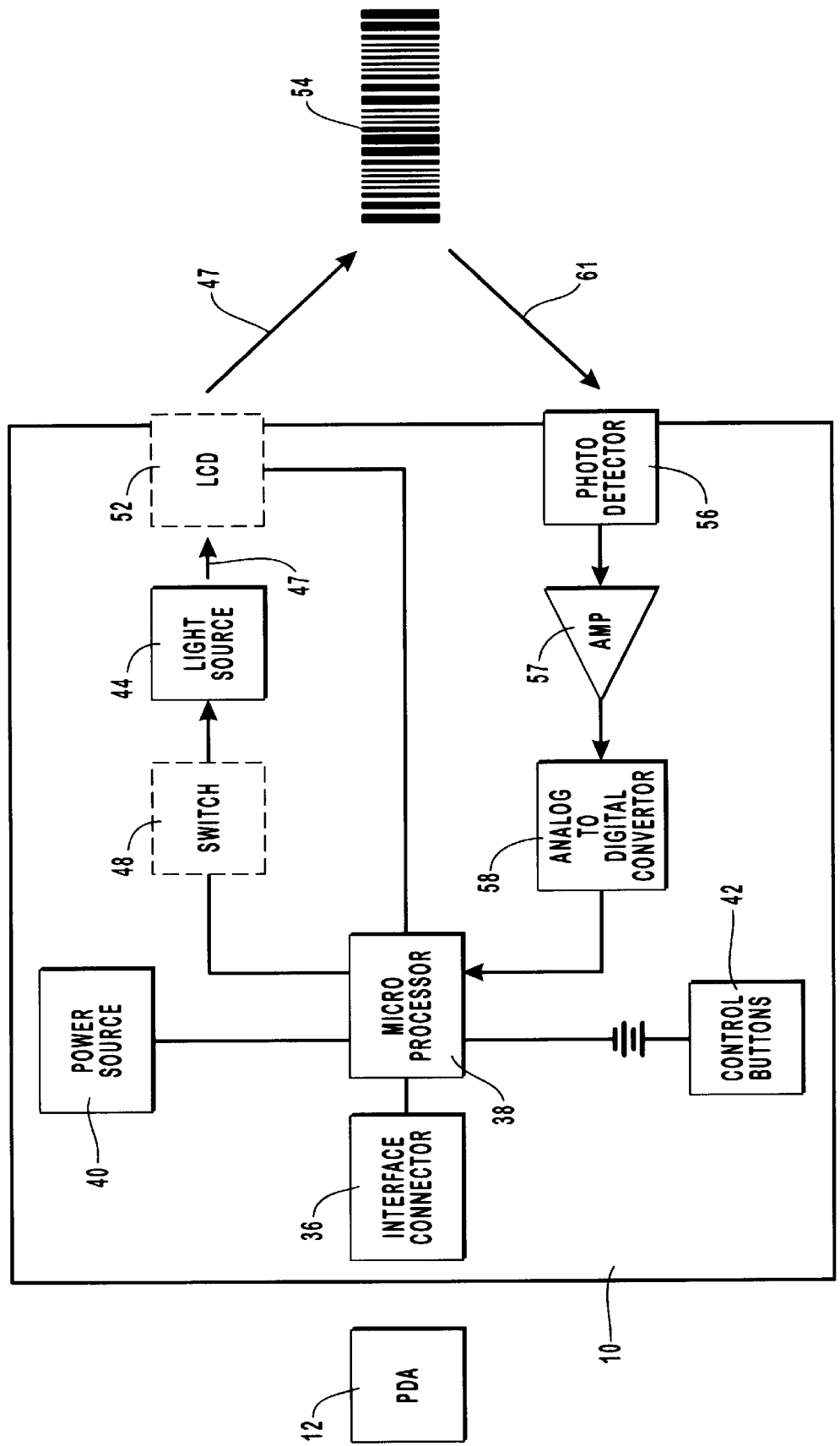
FIG. 3 is a block diagram of the adapter shown in FIG. 1 interacting with a bar code.

Adapter 10 can also be configured for reading a bar code 54. For example, as depicted in FIGS. 1 and 3, photo detector 56 is positioned at free end 30 of arm 28 adjacent to window 46. Photo detector 56 is electrically coupled to an analog to digital converter 58 which is coupled with micro controller 38 through amplifier 57. Light source 44 and photo detector 56 are selectively positioned such that as light beam 47 is manually scanned across bar code 54, a portion 61 of light beam 47 is reflected off of the reflective sections of bar code 54 and is received by photo detector 56. Portion 61 of light beam 47 detected by photo detector 56 is in an analog signal which is converted to a digital signal by converter 58. The signal is then transferred to microprocessor 38 for decoding and subsequently sent to PDA 12. In this embodiment, light source 44 emits a thin highly collimated light beam 47 such as those used in conventional scanners.

By using the above configuration, bar codes can be quickly entered into PDA 12 without having to manually input the information. Depending on the intended use and operational software, PDA 12 can either simply store the bar code reading or can be used to access other information based on the bar code reading. By using adapter 10, PDA 12 can be used for inventory control or in other situations where bar codes can be used.

Figure 4:
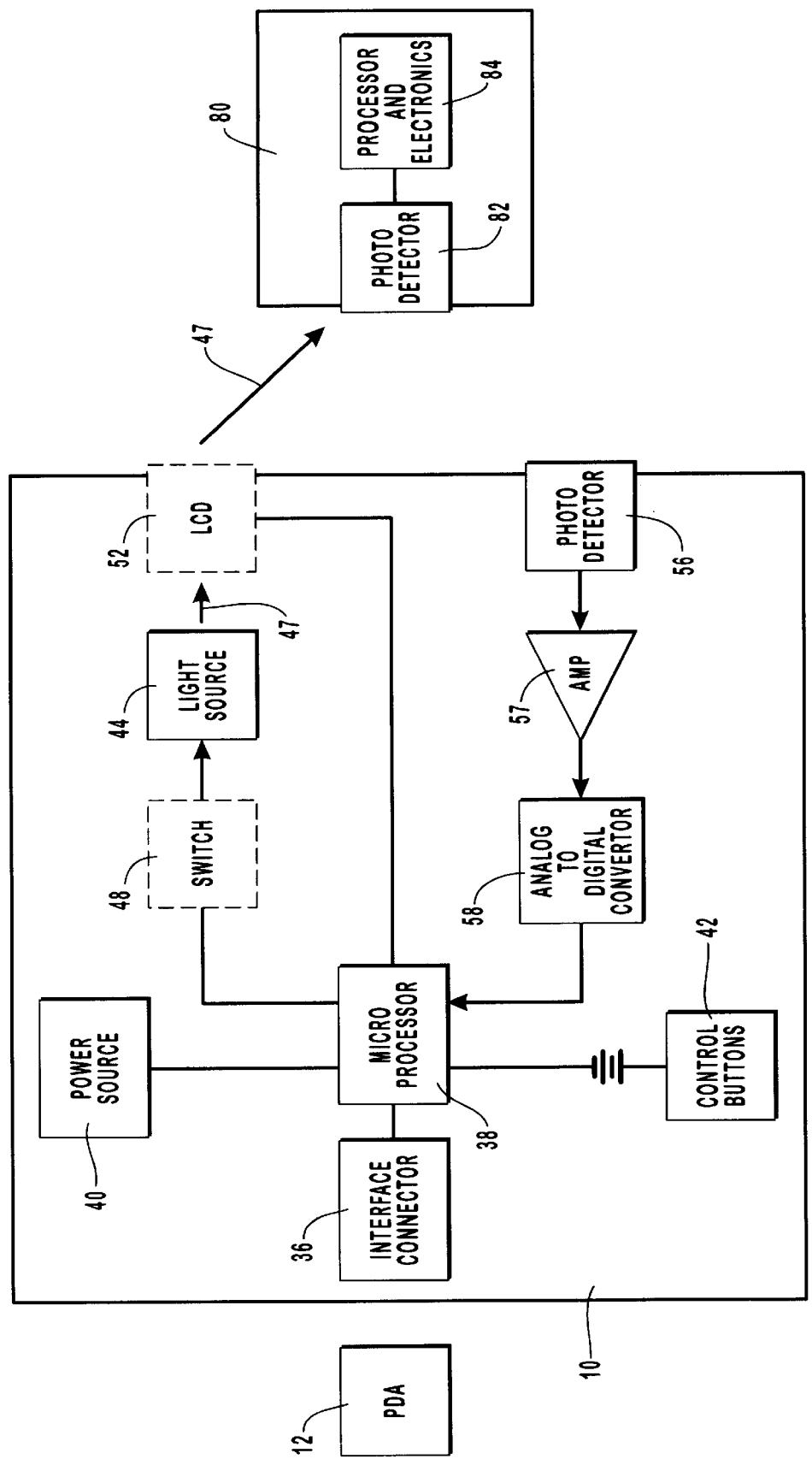
FIG. 4 is a block diagram of the adapter shown in FIG. 1 interacting with a remote controllable device.

Adapter 10 can also interact with PDA 12 to facilitate operation of a remote-controllable device such as a television, VCR, or stereo. As depicted in FIG. 4, a remote-controllable device 80 is depicted as comprising a photo detector 82 which is electrically coupled with a processor 84 and device electronics. By loading appropriate software in PDA 12, light source 44 can be operated by microprocessor 38 to emit low speed pulses to remote-controllable device 80 for remotely controlling the device.

In one embodiment it is envisioned that software code corresponding to a plurality of different remote-controllable device 80 is loaded in memory 13 of PDA 12. Display screen 19 can be used to access a list of available remote-controllable device. By choosing a select remote-controllable device from the list, processor 11 can operate the corresponding software to assign control buttons to perform specific functions relative to operation of the select remote-controllable device. Alternatively, a list of functional operations can be listed on display screen 19. By selecting a desired function, processor 11 or 38 operates light source 44 to emit a desired light pulse that when received by the select remote-controllable device signals the device to perform the desired function. For example, by accessing software on the PDA for a television, depressing a select control button 42 on either PDA 12 or adapter 10 generates a low speed pulse that turns the television on or off. Of course other functions such as volume or channels can also be selectively changed. Performing functions such as downloading data stored in memory 13 of PDA 12 can be executed using similar steps.

It is noted that the operation of adapter 10 for downloading information to computer 70 is different than operation of adapter 10 for remote control of a device. This is because the bit rates are substantially different for the different uses. From a practical standpoint, downloading information from PDA 12 to computer 70 requires a bit rate of about 20 kbps or higher. In contrast, operation of a remote-controllable device requires a bit rate of about 10 bps.

Figure 5:
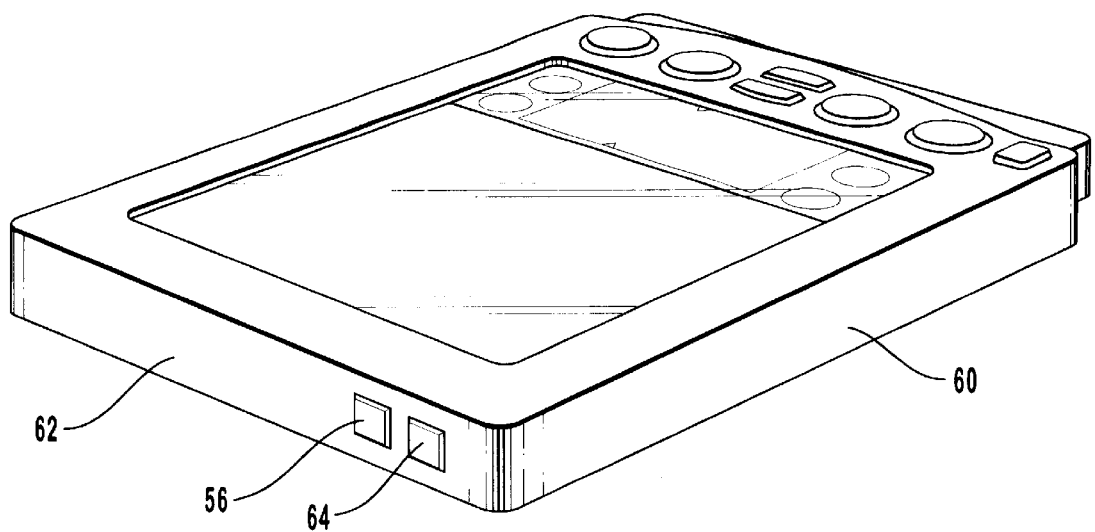
FIG. 5 is a perspective view of a PDA incorporating the electronics of the adapter shown in the FIG. 1.

As depicted in FIG. 5, the present invention also envisions that the electronic circuity of adapter 10, as depicted and discussed with regard to FIGS. 1–5, can be integrally incorporated into a single PDA 60. For example, PDA 60 is depicted having a top end 62. Formed at top end 62 is a window 64 through which a light beam from a light source within PDA 60 can emanate. Adjacently positioned to window 64 is photo detector 56. Of course circuitry which is already found in a conventional PDA, such as a micro processor and a power system, need not be redundantly transferred from adapter 10 into PDA 60.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An adapter for removable attachment to a PDA, the adapter comprising:
   (a) an interface connector configured to removably electrically couple with the PDA;
   (b) a micro controller electrically coupled with the interface connector;
   (c) a light source configured to emit a light beam; and
   (d) a photo detector electrically coupled to the micro controller.

2. An adapter as recited in claim 1, wherein the light source is a laser.

3. An adapter as recited in claim 2, further comprising means for converting the light beam from the light source into a digital signal.

4. An adapter as recited in claim 3, wherein the means for converting the light beam comprises switching circuitry for turning the light source on and off.

5. An adapter as recited in claim 3, wherein the means for converting the light beam comprises an LCD positioned in the path of the light beam, the LCD being operable between an on position which blocks the light beam and an off position which allows the light to pass therethrough.

6. An adapter as recited in claim 3, wherein the light source can be used to download data to a computer over a distance greater than about ten feet, without the required use of a cradle or other electrical connection.

7. An adapter as recited in claim 6, wherein a transmission bit rate of the digital signal sent between the adapter and the computer is about 20 kbps or higher.

8. An adapter as recited in claim 1, further comprising means electrically coupled to the micro controller for converting electrical signals between analog and digital.

9. An adapter as recited in claim 8, wherein the light source and the photo detector are configured such that the light beam from the light source can be reflected off a bar code and received by the photo detector.

10. An electrical apparatus comprising:
   (a) a PDA comprising a low profile box shaped case having a front face extending between a top end and a bottom end, a display screen is positioned on the front face and a first interface connector is positioned at the bottom end, the case of the PDA enclosing a microprocessor;
   (b) an adapter comprising:
      (i) a substantially L-shaped housing comprising a base and an arm, the arm projecting from the base to a free end;
      (ii) a second interface connector mounted to the base of the housing, the second interface connector being configured to electrically couple with the first interface connector for transferring electrical signals therebetween;
      (iii) means for removably coupling the housing of the adapter to the PDA such that the first and second interface connectors are electrically coupled and the free end of the arm is positioned at the top end of the PDA case;
      (iv) a light source at least partially disposed within the arm and configured to emanate a light beam through the free end thereof;
      (v) a photo detector at least partially positioned at the free end of the arm; and
      (vi) an analog to digital converter disposed within the housing and electrically coupled to the photo detector.

11. An electrical apparatus as recited in claim 10, wherein a micro processor is disposed within the adapter housing and is electrically coupled with the analog to digital converter.

12. An electrical apparatus as recited in claim 10, wherein the adapter housing comprises a battery compartment.

13. An electrical apparatus as recited in claim 10, wherein the light source is a laser.

14. An electrical apparatus as recited in claim 13, wherein the laser emits a visible red light that is sufficiently collimated to function as a pointer.

15. An electrical apparatus as recited in claim 10, wherein the adapter further comprises a manual button for turning the light source on and off.

16. An electrical apparatus as recited in claim 10, wherein the light source and the photo detector are configured such that the light beam from the light source can be reflected off a bar code and received by the photo detector.

17. An electrical apparatus as recited in claim 10, further comprising an LCD positioned in the path of the light emitting from the light source, the LCD being operable between an on position which blocks light from passing therethrough and an off position which allows light to pass therethrough.

18. A PDA comprising:
(a) a housing having a front face extending between a top end and an opposing bottom end, a display screen is positioned on the front face and an interface connector is positioned at the bottom end,
(b) a micro controller is disposed within the housing and is electrically coupled to the connector;
(c) a laser is disposed within the housing and is configured to emit a light beam through the top end of the housing;
(d) a analog to digital converter is disposed within the housing and is electrically coupled with the micro controller;
(e) a photo detector is positioned at the top end of the housing and is configured to receive reflected light from the laser.

19. A PDA as recited in claim 18, further comprising means for converting light from the laser into a digital signal.

20. A PDA as recited in claim 18, wherein the laser emits a visible red light that is sufficiently collimated to function as a pointer.

* * * * *

UNITED STATES PATENT AND TRADEMARK OFFICE
CERTIFICATE OF CORRECTION

PATENT NO. : 6,065,880
DATED : May 23, 2000
INVENTOR(S) : Curtis Thompson It is certified that error appears in the above-identified patent and that said Letters Patent are hereby corrected as shown below:

col. 1, line 8, please change "adapters therefor" to -- adapters -- col. 2, line 7, please change "thin highly" to -- thin, highly -- col. 3, line 34, please change "housing (BOLD)10(BOLD)" to -- housing (BOLD)9(BOLD) -- col. 3, line 35, plese change "RS(BOLD)232(BOLD)" to -- RS232 --

Fig. 2, please change label "80" to -- 79 --; and col. 4, line 3, please change "driver (BOLD)80(BOLD)" to -- driver (BOLD)79(BOLD) -- col. 4, line 18, please change "embodiment, light source" to -- embodiment, the light source -- col. 4, line 62, please change "is in an" to -- is an -- col. 5, line 29, please change "that when" to -- that, when -- col. 5, line 30, please change " device signals" to -- device, signals --

Signed and Sealed this

Eighth Day of May, 2001

*Attest:*

NICHOLAS P. GODICI

*Attesting Officer*     Acting Director of the United States Patent and Trademark Office

EX PARTE REEXAMINATION CERTIFICATE (8586th)

United States Patent
Thompson

(10) Number: US 6,065,880 C1
(45) Certificate Issued: Oct. 4, 2011

(54) LASER ENHANCED PERSONAL DATA ASSISTANT

(75) Inventor: Curtis Thompson, Salt Lake City, UT (US)

(73) Assignee: Intellectual Asset Group, LLC, West Bloomfield, MI (US)

Reexamination Request:
No. 90/011,561, Mar. 18, 2011

Reexamination Certificate for:
Patent No.: 6,065,880
Issued: May 23, 2000
Appl. No.: 09/036,851
Filed: Mar. 9, 1998

Certificate of Correction issued May 8, 2001.

(51) Int. Cl.
*G06F 1/16* (2006.01)

(52) U.S. Cl. .................... 385/88; 235/454; 710/72
(58) Field of Classification Search .................. None
See application file for complete search history.

(56) References Cited

U.S. PATENT DOCUMENTS

| | | |
|---|---|---|
| 4,621,189 A | 11/1986 | Kumar et al. |
| 4,916,441 A | 4/1990 | Gombrich |
| 4,943,868 A | 7/1990 | Yoshinagawa et al. |
| 4,983,818 A | 1/1991 | Knowles |
| 5,107,100 A | 4/1992 | Shepard et al. |
| 5,202,817 A | 4/1993 | Koenck et al. |
| 5,216,233 A | 6/1993 | Main et al. |
| 5,218,187 A | 6/1993 | Koenck et al. |
| 5,278,399 A | 1/1994 | Sano |
| 5,294,782 A | 3/1994 | Kumar |
| 5,313,051 A | 5/1994 | Brigida et al. |
| 5,313,053 A | 5/1994 | Koenck et al. |
| 5,331,136 A | 7/1994 | Koenck et al. |
| 5,331,580 A | 7/1994 | Miller et al. |
| 5,371,348 A | 12/1994 | Kumar et al. |
| 5,380,994 A | 1/1995 | Ray |
| 5,404,493 A | 4/1995 | Bolme et al. |
| 5,406,063 A | 4/1995 | Jelen |
| 5,410,141 A | 4/1995 | Koenck et al. |
| 5,418,684 A | 5/1995 | Koenck et al. |
| 5,496,992 A | 3/1996 | Madan et al. |
| 5,515,303 A | 5/1996 | Cargin, Jr. et al. |
| 5,521,369 A | 5/1996 | Kumar |
| 5,576,530 A | 11/1996 | Hagerty |
| 5,640,002 A | 6/1997 | Ruppert et al. |
| 5,664,231 A | 9/1997 | Postman et al. |
| 5,679,943 A | 10/1997 | Schultz et al. |
| 5,805,416 A | 9/1998 | Friend et al. |
| 5,821,518 A | 10/1998 | Sussmeier et al. |
| 5,831,819 A | 11/1998 | Chacon et al. |
| 5,834,753 A | 11/1998 | Danielson et al. |
| 5,923,735 A | 7/1999 | Swartz et al. |
| 6,014,705 A | 1/2000 | Koenck et al. |
| 6,023,147 A | 2/2000 | Cargin, Jr. et al. |
| 6,031,524 A | 2/2000 | Kunert |
| 6,041,374 A | 3/2000 | Postman et al. |
| 6,052,279 A | 4/2000 | Friend et al. |
| 6,149,062 A | 11/2000 | Danielson et al. |
| 6,285,916 B1 | 9/2001 | Kadaba et al. |
| 6,497,368 B1 | 12/2002 | Friend et al. |
| 6,895,419 B1 | 5/2005 | Cargin, Jr. et al. |

*Primary Examiner* — Deandra Hughes

(57) ABSTRACT

An adapter having an L-shaped housing is configured for removable attachment to a conventional PDA. The adapter is electrically coupled with the PDA and includes a laser or other light source configured to selectively emanate a light beam that can be modified into a digital signal. The digital signal can be received by a photo detector on a computer for facilitating a download of data from the PDA to the computer. The light beam from the laser can also be used as a presentation pointer. The adapter further includes a photo detector which is selectively positioned relative to the laser so that the light beam from the laser can be reflected off a bar code and received by the photo detector. The reflected signal is then converted to a digital signal which is then forwarded to the PDA for storage or access of other corresponding information.

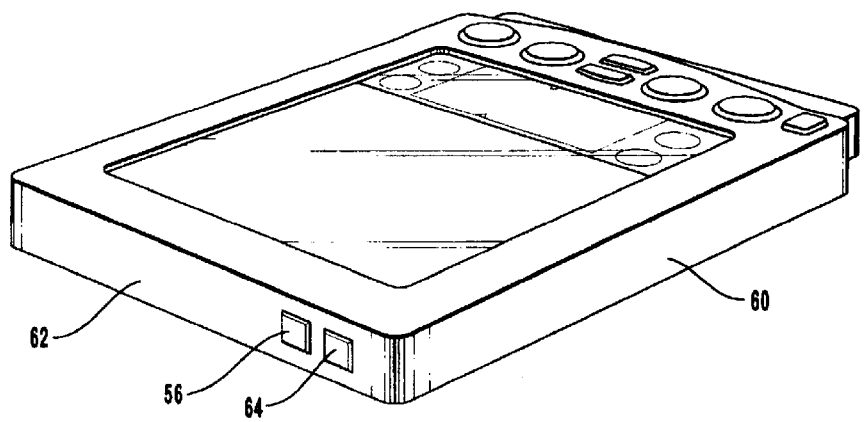

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 18 is determined to be patentable as amended.

Claims 19 and 20, dependent on an amended claim, are determined to be patentable.

Claims 1-17 were not reexamined.

18. A PDA comprising:

*a single embedded PDA design comprising:*

(a) a housing having a front face extending between a top end and an opposing bottom end, a display screen is positioned on the front face and an interface connector is positioned at the bottom end, (b) a microcontroller is disposed within the housing and is electrically coupled to the connector;

(c) a laser is disposed within the housing and is configured to emit a light beam through the top end of the housing;

(d) an analog to digital converter is disposed within the housing and is electrically coupled with the microcontroller (e) a photodetector is positioned at the top end of the housing and is configured to receive reflected light from the laser.

\* \* \* \* \*